M. NELSON.
Gold Washer.
No. 255. A. I. Patented Nov. 8, 1859.
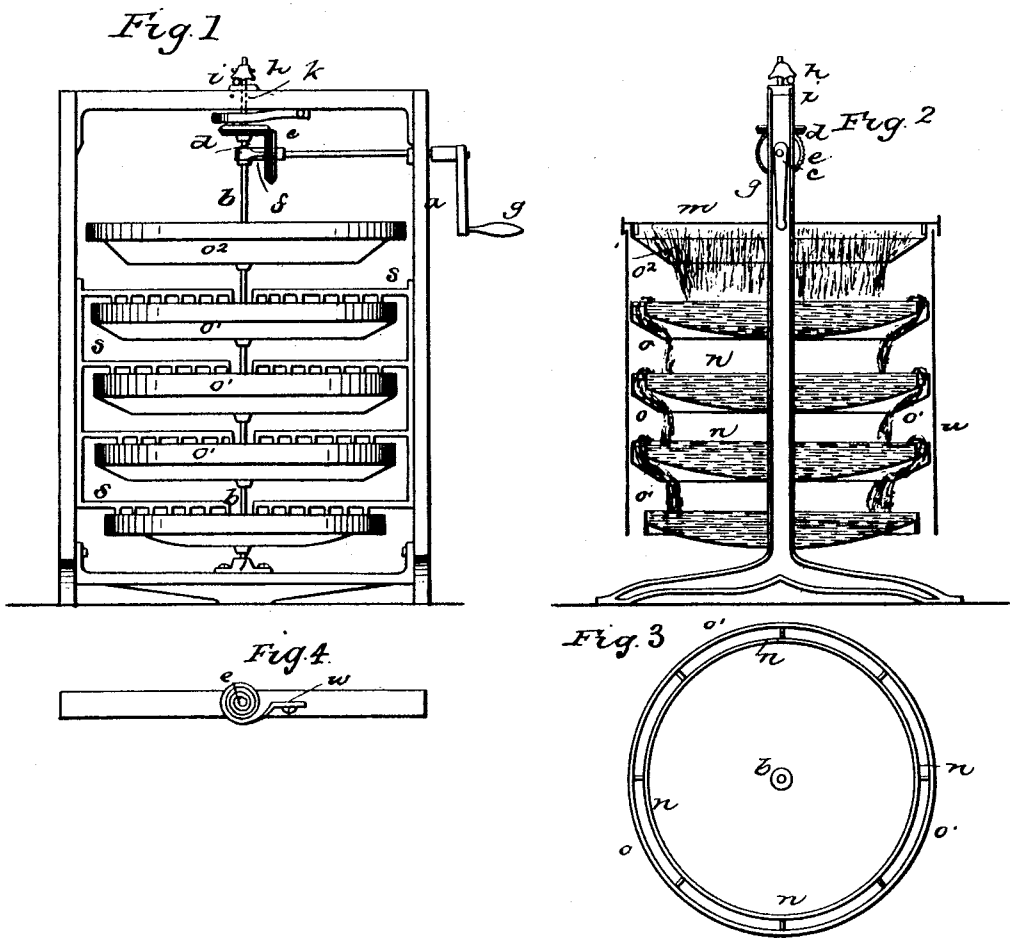
WITNESSES
Samuel W. Duell
Thos. Geo. Harold
INVENTOR
M. Nelson
T. PETERS, Photo-Lithographer, Washington, D. C.